(12) United States Patent
Mehta

(10) Patent No.: US 7,162,573 B2
(45) Date of Patent: Jan. 9, 2007

(54) COMMUNICATION REGISTERS FOR PROCESSING ELEMENTS

(75) Inventor: Kalpesh Dhanvantrai Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 10/603,536

(22) Filed: Jun. 25, 2003

(65) Prior Publication Data
US 2004/0268060 A1    Dec. 30, 2004

(51) Int. Cl.
*G06F 13/00*    (2006.01)
(52) U.S. Cl. .................. 711/109; 711/148; 711/147; 709/213; 709/218; 709/226; 709/214
(58) Field of Classification Search ............... None
See application file for complete search history.

(56) References Cited

U.S. PATENT DOCUMENTS 5,408,671 A * 4/1995 Tanaka ................ 709/214
5,809,322 A * 9/1998 Akerib ................ 712/14

FOREIGN PATENT DOCUMENTS

JP        08235143 A    *    9/1996

* cited by examiner

*Primary Examiner*—B. James Peikari
(74) *Attorney, Agent, or Firm*—Blakely, Sokoloff, Taylor & Zafman LLP

(57) ABSTRACT

Various embodiments of the invention relate to communicating data between a number of processing elements (PEs) of a signal processor, using a plurality of communication registers (CCRs). For instance, a plurality of the CCRs can be shared by and mapped to the address space of each PE, where each CCR couples a first of the PEs to every other one of the PEs. Moreover, each CCR can include a data payload field and a data valid field to indicate a target PE to read the data in the data payload field. Thus, data can be written to a selected CCR by a PE and stored in the selected CCR to be read by at least one target PE.

13 Claims, 11 Drawing Sheets

COMMUNICATION REGISTERS FOR PROCESSING ELEMENTS

FIELD

Data communication between processing elements.

BACKGROUND

Signal processing, such as still or video image signal processing, often involves one or more digital signal processors for processing data from memory. For example, a single digital signal processor having an embedded microprocessor controller, or multiple digital signal processors in a master/slave relationship have been used. As a result, the data manipulated by such a digital signal processor may be stored in registers external to, but accessible by the processor in order to perform the desired manipulation.

BRIEF DESCRIPTION OF THE DRAWINGS

Various features, aspects and advantages will become more thoroughly apparent from the following detailed description, the set claims, and accompanying drawings in which:

DETAILED DESCRIPTION

Figure 1A:
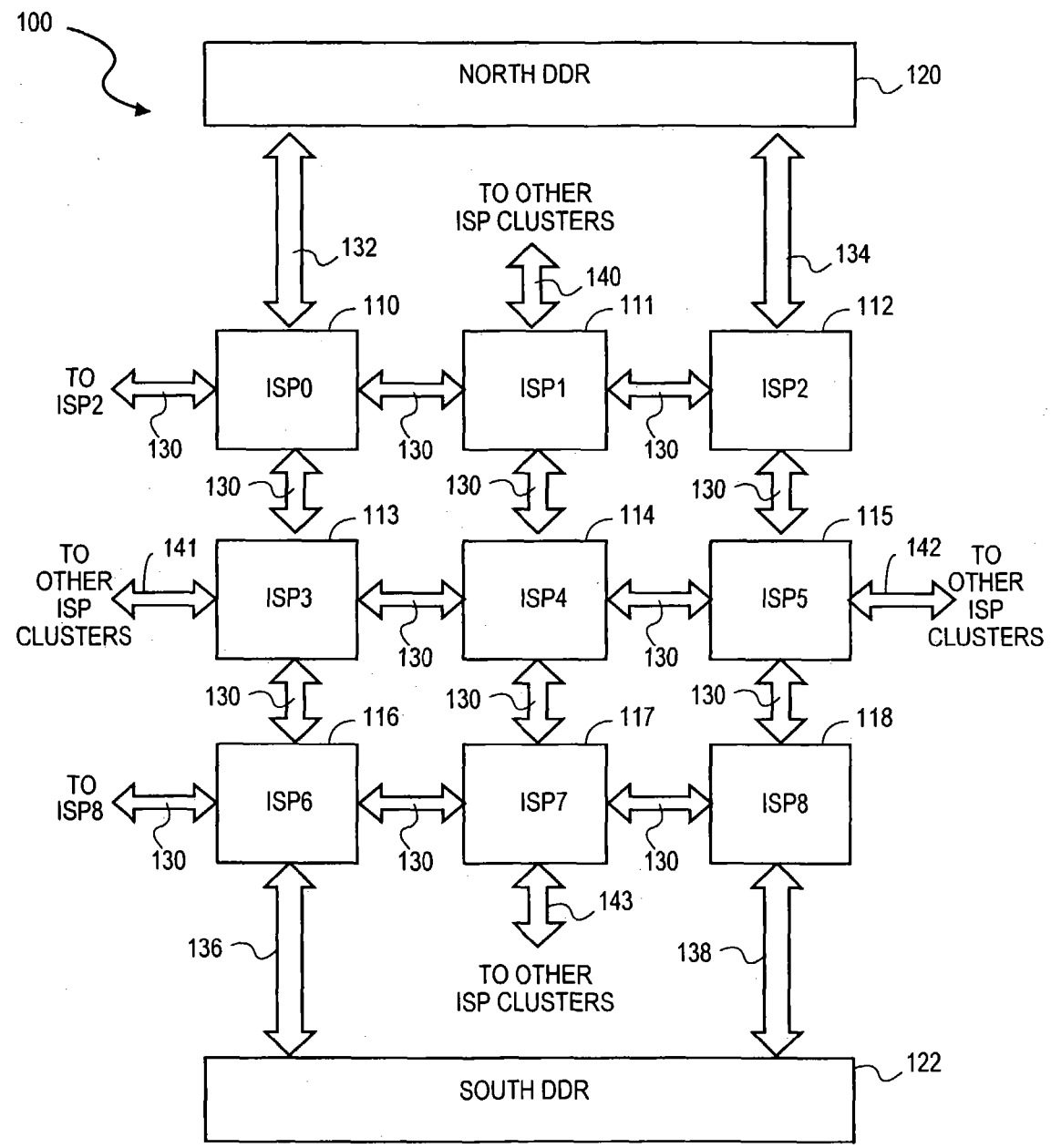
FIG. 1A is a block diagram of a cluster of nine interconnected image signal processors (ISP) coupled to double data rate (DDR) random access memory (RAM) and having interfaces for coupling to other ISP clusters.

Various embodiments of the invention relate to communicating data between a number of processing elements of a signal processor, using a plurality of communication registers mapped into the address space of each processing element. Specifically, shared communication registers mapped into the address space of multiple processing elements may more quickly and more efficiently communicate data, such as graphics data, between the multiple processing elements. For instance, each of the communication registers may couple a first of the processing elements to every other processing element. Thus, faster and more efficient communication of data between the processing elements is provided as compared to sharing data between processing elements using separate registers between each pair of processing elements, and/or using registers having addresses that are not mapped into the addressing space of each processing element. For example, FIG. 1A is a block diagram of a cluster of nine interconnected image signal processors (ISP) coupled to double data rate (DDR) random access memory (RAM) (e.g., such as DDR Synchronous Dynamic (SD) RAM) and having interfaces for coupling to other ISP clusters. FIG. 1A shows signal processing system 100 having a cluster of nine digital signal processors, also referred to as "image signal processors" (ISP), where each signal processor is coupled to at least one other signal processor and may also be coupled to one or more various types of memories and/or other signal processing clusters (e.g., such as other signal processing systems similar to system 100). For example, a hierarchical image processing image architecture similar to system 100 can be used for image processing related to a copier, a scanner, a printer, or other image processing device including to process a raster image, a Joint Photographic Experts Group (JPEG) image, a Moving Picture Experts Group (MPEG) image, or other digital image data.

As shown in the first row of signal processors of FIG. 1A, ISP0 110 is coupled to ISP1 111 via ISP coupling 130, and is coupled to ISP2 112 and ISP3 113 via other ISP couplings 130. In addition, ISP0 110 is shown coupled to north DDR RAM (north DDR) 120 via north DDR coupling 132. For example, a DDR memory may store digital image data, such as a complete image or complete images. In addition to being coupled to ISP0 110 as explained above, ISP1 111 is also coupled to ISP2 112 and ISP4 114 via other ISP couplings and may be coupled to other ISP clusters (e.g., such as other signal processing systems similar to system 100) via other ISP cluster coupling 140. In addition to the couplings described above, ISP2 112 is also coupled to ISP5 115 via an ISP coupling and coupled to north DDR 120 via north DDR coupling 134.

In the second row of signal processors in addition to the couplings above, ISP3 113 is coupled to ISP4 114 and ISP6 116 via ISP couplings and may be coupled to another ISP cluster via ISP cluster coupling 141. In addition to the couplings described above, ISP4 114 is coupled to ISP5 115 and ISP7 117 via ISP couplings. Furthermore, in addition to couplings described above, ISP5 115 is coupled to ISP8 118 via an ISP coupling and may be coupled to another ISP cluster via other ISP cluster coupling 142.

Next, in the third row of signal processors, ISP6 116 is coupled to ISP8 118 and ISP7 117 via an ISP coupling and may be coupled to south DDR RAM (south DDR) 122 via south DDR coupling 136, in addition to the couplings described above. Moreover, in addition to the couplings described above, ISP7 117 is coupled to ISP8 118 via an ISP coupling and may be coupled to another ISP cluster via other ISP cluster coupling 143. Finally, besides the couplings described above, ISP8 118 is also shown coupled to south DDR via south DDR coupling 138.

Figure 1B:
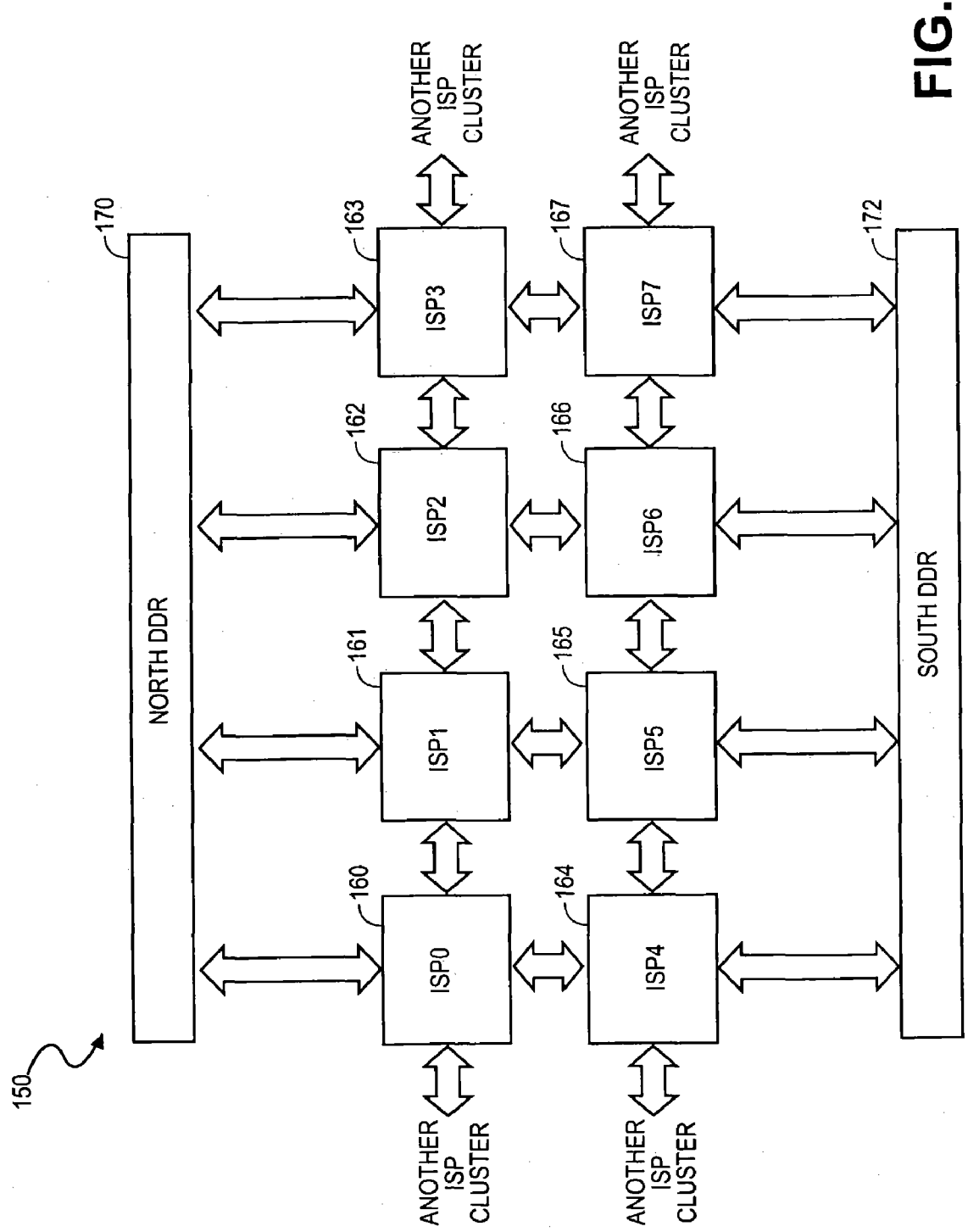
FIG. 1B is a block diagram of a cluster of eight interconnected ISPs coupled to DDRs and having interfaces for coupling to other ISP clusters.

Although nine signal processors (e.g., ISPs) are shown in FIG. 1A, the number of signal processors can be increased or decreased to more or fewer than nine in other embodiments without any significant change in the system architecture. Moreover, in other embodiments, the type of couplings to each ISP may be varied. For example, ISP0 may be coupled to an ISP of another ISP cluster, instead of to ISP2 via coupling 130. Similarly, ISP3 may be coupled to ISP5 instead of coupled to another ISP cluster via coupling 141. Specifically, for example, FIG. 1B is a block diagram of a cluster of eight interconnected ISPs coupled to DDRs and having interfaces for coupling to other ISP clusters. For example, FIG. 1B shows signal processing system 150 having a cluster of eight signal processors arranged in two rows of four signal processors. As shown, ISP0 160 is coupled to ISP1 161, ISP4 164, an ISP of another cluster, and north DDR 170. In turn, ISP1 161 is also coupled to ISP2 162, ISP5 165, as well as to north DDR 170. Next, ISP2 162 is additionally coupled to ISP3 163, ISP6 166, as well as to north DDR 170. Next, IPS3 163 is also coupled to ISP7 167, an ISP of another cluster, and north DDR 170. The lower row of signal processors is coupled in a mirror image structure to that described above with respect to signal processors 0–3 except that the lower row is coupled to south DDR 172. Note that although ISPs are shown and described with respect to FIGS. 1A and 1B, according to embodiments, the ISPs may include signal processors, digital signal processors, or various other appropriate signal processors coupled together to create a signal processing system having at least one signal processor that has functionality, as described herein.

Figure 2:
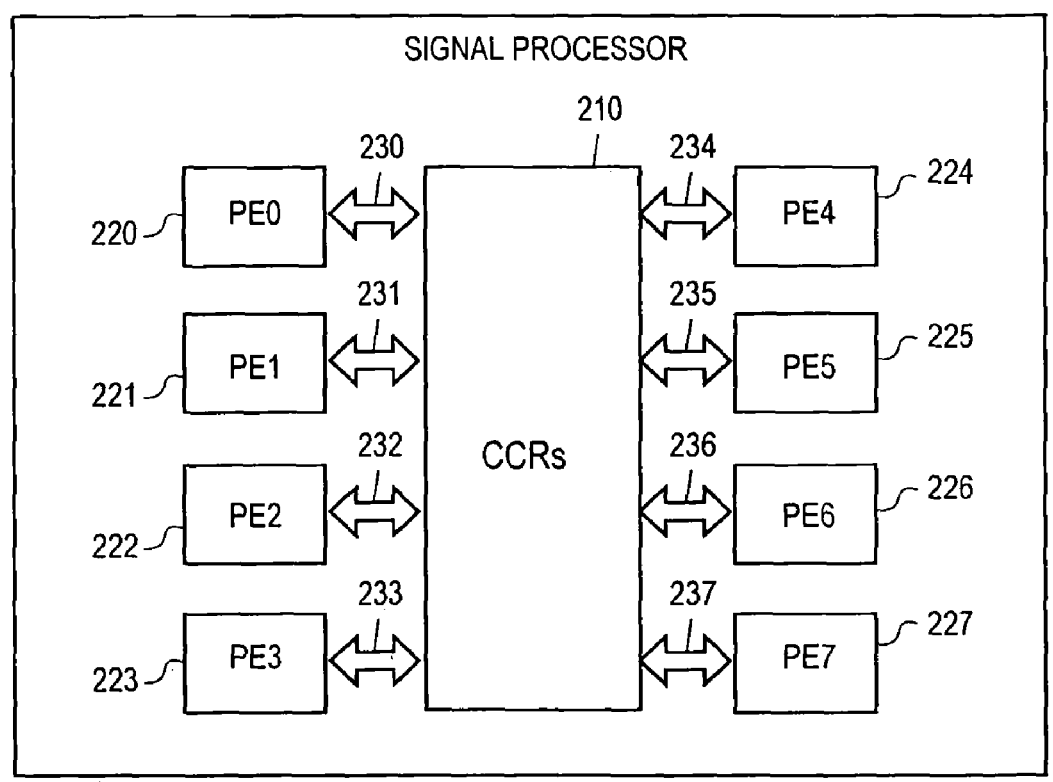
FIG. 2 is a block diagram of a signal processor showing eight processing elements (PEs) intercoupled to each other via cluster communication registers (CCRs), according to one embodiment of the invention.

FIG. 2 is a block diagram of an ISP showing eight processing elements (PEs) intercoupled to each other via cluster communication registers (CCRs), according to one embodiment of the invention. As shown in FIG. 2, the signal processor includes eight programmable processing elements (PEs) coupled to cluster communication registers (CCRs) 210. Specifically, PE0 220 is coupled to CCRs 210 via PE CCR coupling 230, PE1 221 is similarly coupled via PE CCRs 231, PE2 222 via coupling 232, PE3 223 via coupling via 233, PE4 224 via coupling 234, PE5 225 via coupling 235, PE6 226 via coupling 236, and PE7 227 is coupled to CCRs 210 via coupling 237. According to embodiments, CCRs for coupling each PE to every other PE, may have various electronic circuitry and components to store data (e.g., such as to function as a communication storage unit, a communication register, a memory command register, a command input register, or a data output register as described herein). Such electronic circuitry and components may include registers having a plurality of bit locations, control logic, logic gates, multiplexers, switches, and other circuitry for routing and storing data.

Moreover, in embodiments, PEs may be various types of processing elements for processing digital data, such as hardwired accelerators and memory command handlers. For example, from one to three of the PEs (e.g., PE5 and PE6) may be configured as hardwired accelerators, and one of the PEs (e.g., PE4 224) may be configured as a memory command handler (MCH) functioning as a special hardwired accelerator to manage the data flow, for the other PEs in and out of a local memory (this MCH should not be confused with the MCH component in processor chipsets). Thus, for example, an embodiment may include a cluster of five PEs (e.g., PE0 through PE3 and PE7), two hardwired accelerators (e.g., PE5 and PE6), and one MCH (e.g., PE4) interconnected through a shared memory core (e.g., implemented CCRs 210). More particularly, according to embodiments, the PEs, hardwired accelerators, and MCH in a signal processor can communicate with each other through a plurality of CCRs (e.g., for example, CCRs 210 may include sixteen CCRs), where each CCR is coupled to and mapped to the local address space of each PE, each hardwired accelerator, and the MCH.

Further, in embodiments, the MCH has an interface for simultaneously reading and writing data to and from all of the CCRs. In addition, each of the PEs has an interface that allows that PE to simultaneously read from up to two different CCRS, while simultaneously writing to any one of the CCRs during a clock cycle, by addressing the registers of any of the sixteen CCRs as local address space. For instance, a plurality of the CCRs can be shared by and mapped to the address space of each PE, where each CCR couples a first of the plurality of PEs to every other one of the PEs. Thus, data can be written to a selected CCR by a PE and stored in the selected CCR to be read by at least one other PE (although it is also possible for a PE to write to itself via this process). Moreover, although embodiments described herein may specify sixteen CCRs, more than sixteen CCRs (e.g., such as eighteen, twenty, thirty-two or more CCRs) may be used; or, fewer than sixteen CCRs (e.g., such as one, two, four, eight, or any of ten through fifteen CCRs) may be used.

Figure 3:
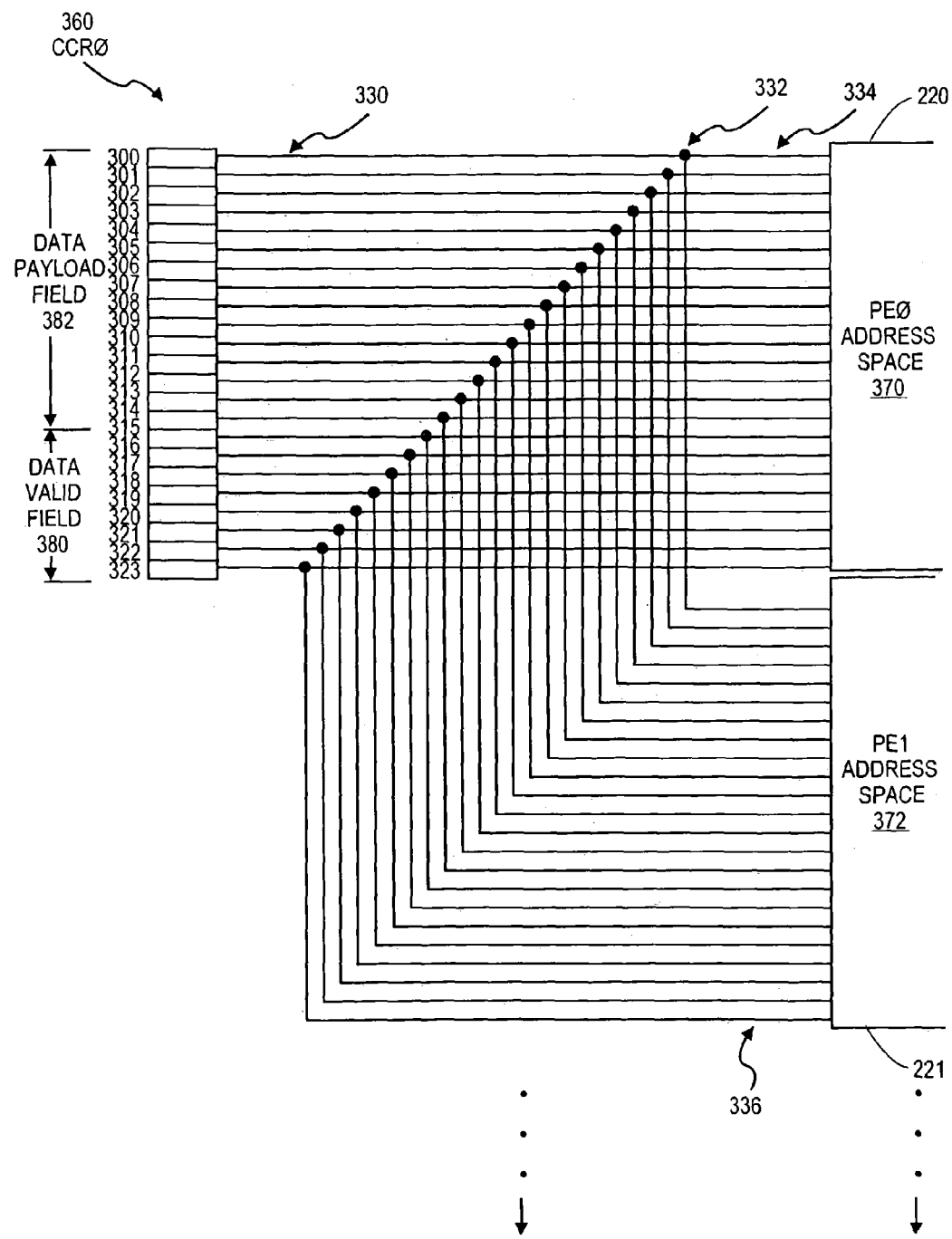
FIG. 3 is a register map of a CCR showing an example of the coupling between the registers and the address space of PEs, according to one embodiment of the invention.

Embodiments include CCRs having sixteen data bit locations and coupled to PEs via sixteen bit wide data paths, such as for image processing of pixels represented by a sub-sampled color spaced in sixteen bits (e.g., such as a sub-sampled color spaced YU, YV, or La, Lb, or YCr, YCb, etc.). For example, FIG. 3 is a register map of a CCR showing an example of the coupling between the registers and the address space of PEs, according to one embodiment of the invention. As shown in FIG. 3, CCR0 360 includes bit locations 300 through 323, each register coupled to one of CCR0 register to all PE address space mapping lines 330. Lines 330 are coupled to CCR0 register to all PE address space mapping nodes 332. Moreover, nodes 332 are coupled to CCR0 register to PE0 address space mapping lines 334, which in turn are coupled to PE0 address space 370. Note that each of lines 330, nodes 332, and lines 334 represents a direct mapping between one of the communication registers and an address space of each of the processing elements. Thus, each of communication bit locations 300 through 323 is mapped directly to PE0 address space 370 via mapping lines 330, mapping nodes 332, and mapping lines 334.

Furthermore, CCR0 register to all PE address space mapping nodes 332 are also coupled to CCR0 register to PE1 address space mapping lines 336, which are in turn coupled to PE1 address space 372. Hence, each of communication bit locations 300 through 323 are also mapped directly to PE1 address space 372 (e.g., in addition to being mapped directly to PE0 address space 370). Accordingly, bit locations 300 through 323 may be shared by PE0 220, as well as PE1 221, and thus, bit locations 300 through 323 may be used to couple PE0 220 to PE1 221, such as through PE0 address space 370 and PE1 address space 372 sharing CCR0 360 via the direct address mapping described above.

Likewise, embodiments include CCR0 register to all PE address space mapping nodes 332 also coupled to CCR0 to PE2 222 through PE7 227 address space mapping lines for mapping bit locations 300 through 323 to the address space of PE2 222 through PE7 227. Thus, bit locations 300 through 323 may be mapped to and shared by the address space of each of PE0 220 through PE7 227, and thus, couple any one of PEs 220 through 227 (e.g., such as PE0 220) to every other of the PEs 220 through 227 (e.g., such as PE1 221 through PE7 227), such as by the address space of any one PE (e.g., such as PE0 address space 370) being coupled to the address space of every other PE (e.g., such as PE1 address space 372 through the address space of PE7) via CCR0 360. Moreover, as the number of PEs may be more than eight PEs, as described above, with respect to FIG. 2, nodes 332 may be additionally coupled to CCR0 to PE address space mapping lines for PEs in addition to PE0 through PE7, to map bit locations 300 through 323 to the address space of PEs in addition to PE0 through PE7.

Figure 5:
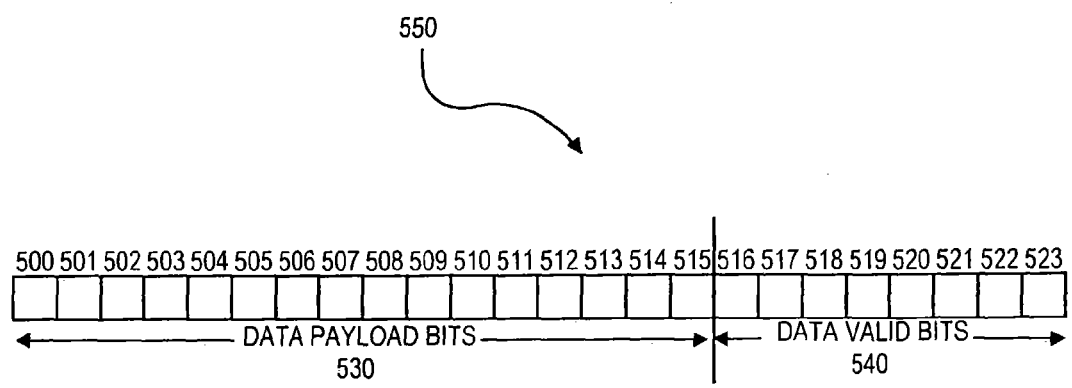
FIG. 5 is a bit map of data for writing to and reading from the CCRs, according to one embodiment of the invention.

FIG. 3 also shows data payload field 382 having bit locations 300 through 315, and data valid field 380 having bit locations 316 through 323. According to embodiments, data valid fields 380 is used to indicate a target (e.g., such as one or more of any of PE0 220 through PE7 227) for a data payload (e.g., such as data loaded into data payload field 382 at bit locations 300 through 315 of CCR0 360. For example, FIG. 5 is a bit map of data for writing to and reading from the CCRs, according to one embodiment of the invention. FIG. 5 shows data 550 having twenty-four bits, bits 500 through 523. Data 550 is divided into data payload bits 530 having bits 500 through 515 and data valid bits 540 having bits 516 through 523. Correspondingly, in embodiments, as the number of PEs is increased or decreased to more or fewer than eight PEs, data valid field 380 and corresponding bit locations 316 through 323, and 516 through 523, can be increased and decreased as well. Thus, bit locations 316 through 323 and 516 through 523 can be increased to more bit locations or fewer bit locations than eight so that there is one bit location for each PE.

Figure 4:
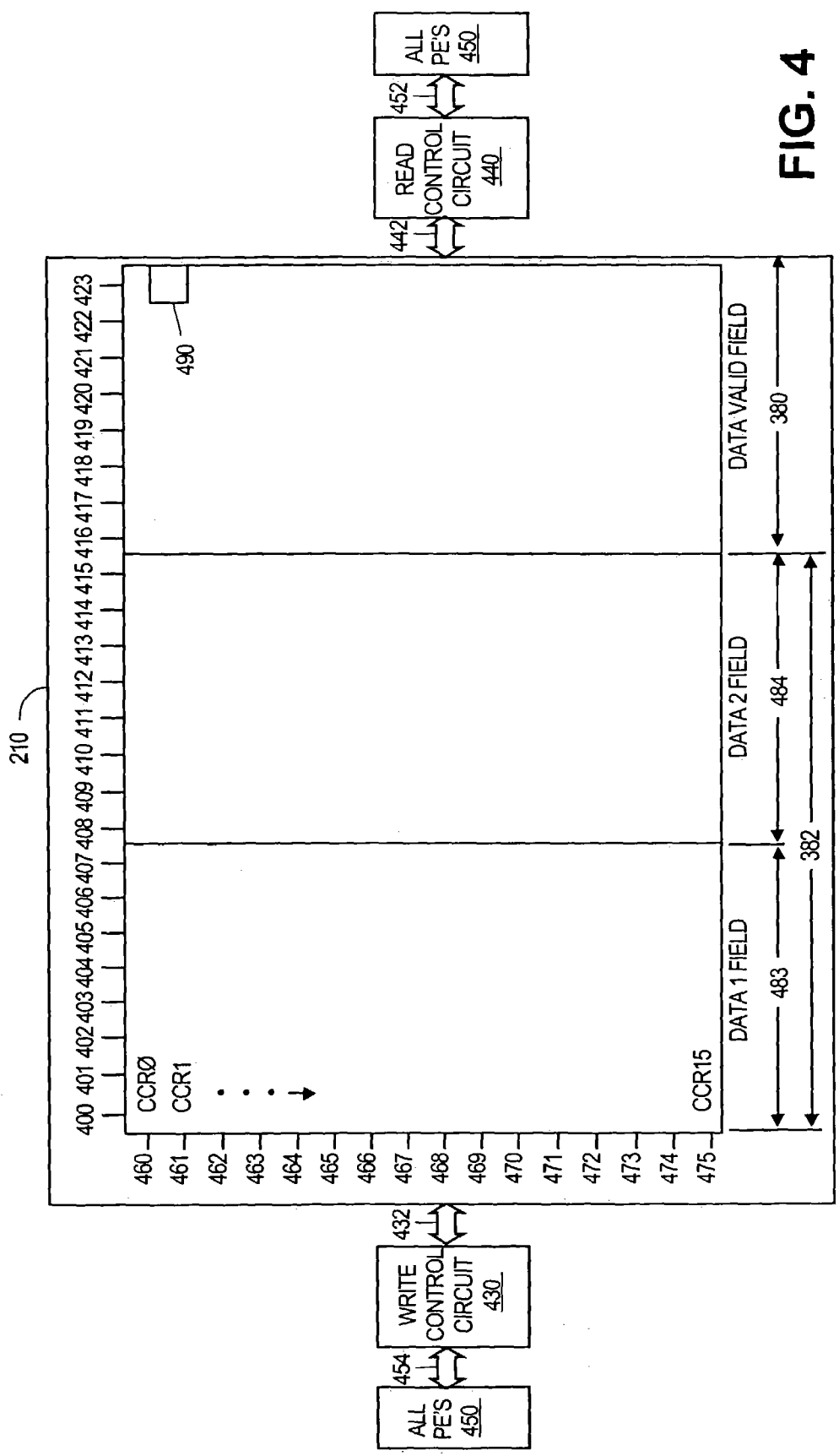
FIG. 4 is a bit map of the CCRs showing the read and write control circuit for interfacing the CCRs with the PEs, according to one embodiment of the invention.

Likewise, according to embodiments, a number of PEs (e.g., such as PE0 220 through PE7 227) each having an addressing space (e.g., each having an address space such as PE0 address space 370) may share and have their address space mapped to a plurality of communication registers, such as a plurality of registers similar to CCR0 360, as described above with respect to FIG. 3. For instance, FIG. 4 is a bit map of the CCRs showing the read and write control circuit for interfacing the CCRs with the PEs, according to one embodiment of the invention. FIG. 4 shows all PEs 450, such as PE0 220 through PE7 227, or another appropriate number of PEs, as described above, coupled by all PEs write coupling 454 to write control circuit 430 which in turn is coupled via write control circuit to CCRs coupling 432 to CCRs 210, to write data from the PEs to the CCRs. Likewise, all PEs 450 are coupled by all PEs read coupling 452 to read control circuit 440 which is coupled via read control circuit to CCRs coupling 442 to all CCRs 210, to allow the PEs to read data from the CCRS, as well.

FIG. 4 also shows all CCRs 210 including sixteen CCRS, each CCR having twenty-four bit locations. More particularly, all CCRs 210 includes CCR0 460 through CCR15 475, each having bit locations 400 through bit location 432. Correspondingly, bit locations 400 through 407 are included Data 1 Field 483 and bit locations 408 and 415 are included in Data 2 Field 484, and bit locations 416 through 423 are included in Data Valid Field 380. Data 1 Field 483 combined with Data 2 Field 484, having bit locations 400 through 415 form data payload field 382.

Hence, each of the plurality of communication registers (e.g., such as each of CCR0 460 through CCR16 475 couples a first of the plurality of processing elements (e.g., such as PE0 220 of all PEs 450) to every other one of the plurality of processing elements (e.g., such as PE1 221 through PE7 227 of all PEs 450), both, via write coupling 454 to write control circuit 430 to write to CCRs coupling 432, as well as via read coupling 452 to read control circuit 440 to read to CCRs coupling 442, to read and write data from the CCRs.

In embodiments, write control circuit 430 may be configured to write data from a PE to a selected communication register (e.g., such as CCR1 461), the data to be stored in the selected communication register and to be read by at least one processing element (e.g., such as PE7 227 of all PEs 450). More particularly, data may be written from a PE, such as PE0 220 of all PEs 450, via coupling 454 to write control circuit 430 to coupling 432 to a selected communication register of all CCRs 210. The data written may then be stored in the selected communication register to be read by at least one processing element (e.g., such as read by PE7 227 of all PEs 450), via coupling 442 to read control circuit 440 to coupling 452. Furthermore, data stored in the selected communication register may be read by more than one PE, such as by access to the stored data being provided to more than one PE for reading (e.g., such as by the stored data being provided to PE1 221 through PE7 227 to be read by those seven PEs).

For example, according to embodiments, PE address space 0 through F (hex) is mapped to CCR0 460 through CCR15 475. Thus, each PE can read and write to any CCR as it would any other register in that PE's local address space. Specifically, any CCR can be used in any of a PE's instructions (e.g., as further explained below after Table 1) as a local register, and/or as a register from which data is being read from or written to. Consequently, the expense to a PE using the CCRs as compared to any other local PE register is 0. According to embodiments, data valid bits 540 and data valid field 380 are used by the PEs and CCRs to indicate a target (e.g., such as one or more of PE0 220 through PE7 227) for a data payload (e.g., such as data 550 or data payload bits 530) stored in a selected CCR (e.g., such as CCR1 461 where data payload bits 530 are stored in data payload field 382 and data valid bits 540 are stored in data valid fields 380 of CCR1).

For instance, in embodiments, read control circuit 440 provides read access (e.g., such as via coupling 442 and 452) to data (e.g., such as data 550) stored in a selected communication register (e.g., such as CCR1 461 in fields 380 and 382 at bit locations 400 through 423) to at least one selected processing element (e.g., such as at least one of PE0 220 through PE7 227) identified by the data valid field (e.g., identified by data valid bits 540 stored in data valid field 380 of CCR1 461). Thus, bit locations 416 through 423 of data valid field 380 may each correspond to a potential target of the plurality of processing elements (e.g., PE0 220 through PE7 227). Specifically, as shown in FIG. 4, bit location 423 and data valid field 380 of CCR1 461, identified by element number 490 in FIG. 4, may correspond to potential target PE7 227 of the plurality of PEs (e.g., PE0 220 through PE7 227 of all PEs 450). Thus, a target for a data payload (e.g., such as PE7 227 being the target for data 550) can be indicated by at least one set data valid bit (e.g., such as bit 532 of data valid bits 540 being set to a logical "1") in one of the plurality of bit locations in the data valid field (e.g., such as a bit location 490 corresponding to bit location 423 of data valid field 380 of CCR1 461). Thus, the data valid field or data valid bit mechanism allows a PE to broadcast data via a CCR to one or more PEs (including the broadcasting PE). As used herein, "set" could be set to "0" or set to "1". Thus, set does not imply any particular logical value.

In other words, a first of the PEs (e.g., PE0 220) can set at least one data valid bit of data written to a CCR (e.g., such as bit 523 of data 550 to be written to CCR1 461), and a second processing element (e.g., such as PE7 227) can read the data stored (e.g., such as stored at CCR1 461) if one of the at least one set data valid bit is in a potential target register corresponding to the second processing element (e.g., if the bit at bit location 490 is set, such as to a logical "1", where bit location 490 corresponds to the second processing element (e.g., PE7 227) via write control circuit 430 and read control circuit 440 and their associated couplings.

In one embodiment, a PE will only read data from a CCR that has a DV bit set corresponding to the reading PE. For example, PE7 227 will only read data 550 stored in CCR1 416 if the data valid bit at bit location 490, corresponding to and thus targeting or selecting PE7, is set.

Figure 6:
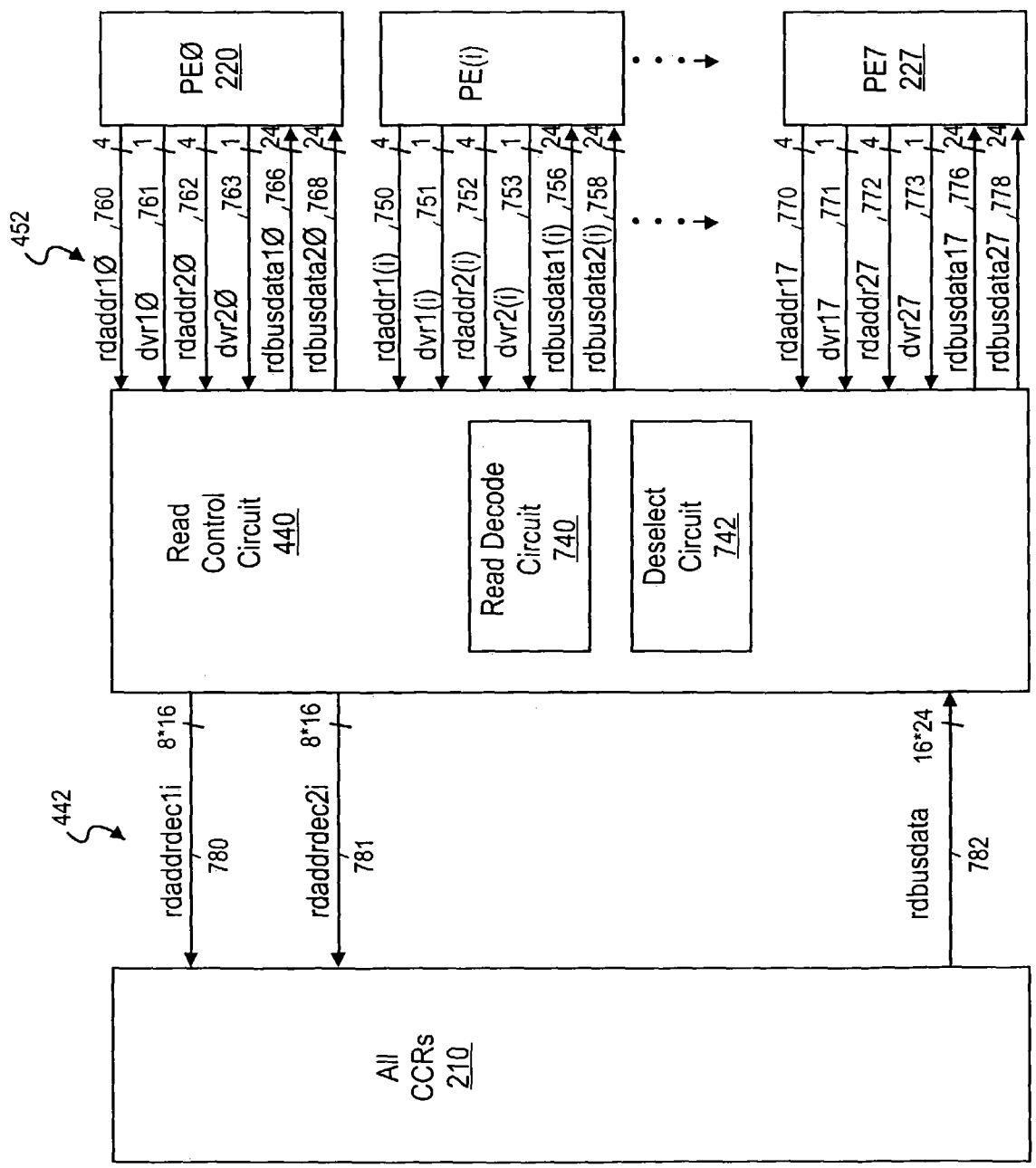
FIG. 6 is a block diagram of the PEs coupled to the read control circuit and CCRs for reading data from the CCRs, according to one embodiment of the invention.

Consequently, coupling 442, read control circuit 440 and coupling 452 provide each PE with access to read from each CCR. For instance, FIG. 6 is a block diagram of the PEs coupled to the read control circuit and CCRs for reading data from the CCRS, according to one embodiment of the invention. As shown in FIG. 6, PE0 220 is coupled to read control circuit 440 via read address channel 1 PE0 (rdaddr10) line 760 for signals having four bits of address, data valid reset channel 1 PE0 (dvr10) line 761 for signals having one bit of reset, read address channel 2 PE0 (rdaddr20) line 762 for signals having four bits of address, data valid reset channel 2 PE0 (dvr20) line 763 for signals having one bit of reset, read bus data channel 1 PE0 (rdbusdata10) line 766 for signals having twenty-four bits of data, and read bus data channel 2 PE0 (rdbusdata20) line 768 for signals having twenty-four bits of data. Line 760 allows PE0 to transmit the read address of a CCR which PE0 desires to read from. Line 766 provides the data read from the address CCR to PE0. When PE0 is done reading the data stored from that CCR, line 761 allows PE0 to transmit a data valid reset signal to indicate that PE0 has completed reading the stored data. Since PE0 has an address line, data line, and data valid reset line for channel 1 and channel 2, PE0 is able to read two sets of data from any two CCRs during a single clock cycle.

According to embodiments, PE, CCR, circuit 440 functionality, and lines corresponding to those described above with respect to lines 760 through 768 may exist for additional PEs and signal lines coupled between read control circuit 440 and each additional PE (e.g., such as PE1 221 through PE7 227). For instance, PE, CCR, and circuit 440 functionality and lines for read address channel 1 to any PE (rdaddr1(i)) line 750 for signals having four bits of address, data valid reset channel 1 to any PE (dvr1(i)) line 751 for signals having one bit of reset, read address channel 2 to any PE (rdaddr2(i)) line 752 for signals having four bits of address, data valid reset channel 2 to any PE (dvr2(i)) line 753 for signals having one bit of reset, read bus data channel 1 (rdbusdata1(i)) line 756 for signals having twenty-four bits of data, and read bus data channel 2 (rdbusdata2(i)) line 758 for signals having twenty-four bits of data, may be included in embodiments. More particularly, such lines for PE7 are shown by lines 770 through 778 coupled between circuit 440 and PE7 227.

FIG. 6 also shows all CCRs 210 coupled to read control circuit 440 via read bus data (rdbusdata) line 782 for sixteen registers (e.g., such as for providing sixteen signals) each having twenty-four bits of data (e.g., such as sixteen CCRs, each with twenty-four bit vectors for mapping the content of all CCR's to the local address space of each PE); reset data valid channel 1 from any PE to any CCR (rdaddrdec1(i)) line 780 for eight signals each having sixteen bits of reset (e.g., such as for eight PEs, each producing sixteen bit decode vectors), and reset data valid channel 2 from any PE to any CCR (rdaddrdec2(i)) line 781 for eight more signals each having sixteen bits of reset (e.g., such as for eight PEs, each producing more sixteen bit decode vectors) to allow circuit 440 to reset or deselect the identification of a target or selected PE in the data valid field of any CCR. Thus, line 782 provides the read bus for data stored on the address CCR to be read by any PE, and, lines 780 and 781 allows circuit 440 to provide a reset DV (e.g., data valid reset) to the addressed CCR when the data stored on the CCR (e.g., such as data at bit locations 400 through 423 of CCR1 461) has been completely read by a target or selected PE. Consequently, circuit 440 is able to provide read data twice from (e.g., via the sixteen signal lines of line 782), and return a data valid reset twice to (e.g., via the eight signal lines of each of lines 780 and 781) any CCR of all CCRs 210 for each PE during a clock cycle.

Although FIG. 6 shows read address lines such as lines 750 and 752 for signals having four bits of address; data valid reset lines such as lines 751 and 753 for signals having one bit of reset; read bus data lines, such as lines 756 and 758 for signals having twenty-four bits of data; read bus data line 782 for sixteen signals each having twenty-four bits of data; and reset data valid lines 780 and 781 each for eight signals each having sixteen bits of reset, embodiments include PE, CCR, and circuit 440 functionality, and lines having various other numbers of signals and bit capacities, such as for more or fewer signals having more or fewer bits than described above.

Moreover, FIG. 6 shows read control circuit 440 including read decode circuit 740 to decode the data valid field of data stored on CCRs (e.g., such as field 380) and to provide read access (e.g., such as via line 758 and line 768, or lines similar to 768 for PEs other than PE0) to data stored in the selected communication register (e.g., such as data 550 stored in any of registers 460 through 475) to a first of the plurality of processing elements (e.g., such as one of PE0 through PE7), if the decoded data valid field corresponds to the first of the plurality of processing elements (e.g., such as if bits 540 of data 550 stored in field 380 correspond to one of processing elements PE0 through PE7). More particularly, for instance, if data 550 stored in CCR1 461 includes bit 523 set of DV bits 540 (e.g., thus, the bit stored at bit location 490 is set) then read decode circuit 740 may provide read access to data 550 stored on CCR1 461 to PE7 227 because bit location 490 corresponds to the data valid field location identifying PE7 227. Again, more than one of bits 540 in field 380 for any CCR may be set. Thus, read decode circuit 740 may decode field 380 and provide read access to data stored in a CCR to a plurality of the PEs (e.g., such as if more than one bit in field 380 for CCR1 461 is set). FIG. 6 also shows read control circuit 440 including deselect circuit 742 to modify the data valid field 380 of data stored in the CCRs. For instance, deselect circuit 742 may modify a bit set in data 550 stored in CCR1 461 indicating that the reading of that data by the selected PE reading the data is complete via line 780.

According to embodiments, deselect circuit 742 may include a reset circuit to reset the first of at least one set data valid bit (e.g., such as a bit located at bit location 490) if a data valid reset signal (e.g., such as a logical "1" via line 751) is received from a PE reading that data (e.g., such as received from PE7 227 via line 771) to indicate that the reading PE has completed reading the stored data (e.g., PE7 227 has completed reading data 550 stored at CCR1 461). Specifically, PE7 may be sending the following signal bits during time $t_1$–$t_3$ to read control circuit 440:

| | time | | |
|---|---|---|---|
| | $t_1$ | $t_2$ | $t_3$ |
| rdaddr17- | 1100 | 1100 | 1100 |
| dvr17- | 0 | 0 | 1 |

In embodiments, read control circuit 440 is implemented using one or more of the following: multiplexers; switches; control logic; logic gates; and other circuitry for routing signals or data. Thus, control logic circuitry such as register transfer level (RTL) can be used to implement the read control circuit and can be described using very high speed integrated circuits (VHSIC) hardware description language (VHDL) like syntax. For instance, Table 1 is a read address pseudo-code example for decoding rdaddr1 and rdaddr2 for each PE, in accordance with an embodiment of the invention.

In the pseudo-code above, the rdaddrdecv(i) is a sixteen bit vector with one bit for each CCR. A bit in rdaddrdecv(i) is set to logical "1" only if the selected CCR (e.g., the CCR addressed by rdaddr1(i)) is being read and the DVR (i) signal from the selected reading PE is a logical "1". The rdaddrdecv(i) will be used to reset the data valid bit corresponding to the selected reading PE in the selected CCR.

Additionally, according to embodiments, PEs are driven by instructions, including instructions to read from one or more CCRs and to write to a CCR. For example, an instruction may be: ADD CCR3, LR0, LR1 ; // CCR3+ LR0=>LR1. This code when executed causes LR1 to read data from CCR3 and LR0, the result of the add operation of data in CCR3 and LR0 is to be written to LR1. To read CCR3, PE1 looks at the DV1 bit of CCR3 to determine if the data in CCR3 is valid. If the DV1 bit is a logical "0", then PE1 waits until it changes to logical "1". Thus, PE1 waits until the DV1 bit changes to 1, and monitors the DV1 bit, such as, by polling or by interrupt. Similarly, other PEs look

TABLE 1

Read Address Pseudo-Code Example

```
-- decode the rdaddr1 and rdaddr2 from each PE (i corresponds to the PE below)
for i in 0 to 7 loop
    if(dvr1(i) = '1') then
        case rdaddr1(i) is
            when "0000" => rdaddrdec1v(i) := "0000000000000001"; -- reg 0
            when "0001" => rdaddrdec1v(i) := "0000000000000010";
            when "0010" => rdaddrdec1v(i) := "0000000000000100";
            when "0011" => rdaddrdec1v(i) := "0000000000001000";
            when "0100" => rdaddrdec1v(i) := "0000000000010000";
            when "0101" => rdaddrdec1v(i) := "0000000000100000";
            when "0110" => rdaddrdec1v(i) := "0000000001000000";
            when "0111" => rdaddrdec1v(i) := "0000000010000000";
            when "1000" => rdaddrdec1v(i) := "0000000100000000";
            when "1001" => rdaddrdec1v(i) := "0000001000000000";
            when "1010" => rdaddrdec1v(i) := "0000010000000000";
            when "1011" => rdaddrdec1v(i) := "0000100000000000";
            when "1100" => rdaddrdec1v(i) := "0001000000000000";
            when "1101" => rdaddrdec1v(i) := "0010000000000000";
            when "1110" => rdaddrdec1v(i) := "0100000000000000";
            when "1111" => rdaddrdec1v(i) := "1000000000000000"; -- reg 15
            when others => rdaddrdec1v(i) := "0000000000000000"; -- none
        end case;
    else
        rdaddrdec1v(i) := "0000000000000000";
    end if;
    if(dvr2_and_run(i) = '1') then
        case rdaddr2(i) is
            when "0000" => rdaddrdec2v(i) := "0000000000000001"; -- reg 0
            when "0001" => rdaddrdec2v(i) := "0000000000000010";
            when "0010" => rdaddrdec2v(i) := "0000000000000100";
            when "0011" => rdaddrdec2v(i) := "0000000000001000";
            when "0100" => rdaddrdec2v(i) := "0000000000010000";
            when "0101" => rdaddrdec2v(i) := "0000000000100000";
            when "0110" => rdaddrdec2v(i) := "0000000001000000";
            when "0111" => rdaddrdec2v(i) := "0000000010000000";
            when "1000" => rdaddrdec2v(i) := "0000000100000000";
            when "1001" => rdaddrdec2v(i) := "0000001000000000";
            when "1010" => rdaddrdec2v(i) := "0000010000000000";
            when "1011" => rdaddrdec2v(i) := "0000100000000000";
            when "1100" => rdaddrdec2v(i) := "0001000000000000";
            when "1101" => rdaddrdec2v(i) := "0010000000000000";
            when "1110" => rdaddrdec2v(i) := "0100000000000000";
            when "1111" => rdaddrdec2v(i) := "1000000000000000"; -- reg 15
            when others => rdaddrdec2v(i) := "0000000000000000"; -- none
        end case;
    else
        rdaddrdec2v(i) := "0000000000000000";
    end if;
end loop;
``` at corresponding DV bits of the CCRs the PEs intend to read to determine if the data stored at those CCRs is valid for the PE to read, or not.

Figure 7:
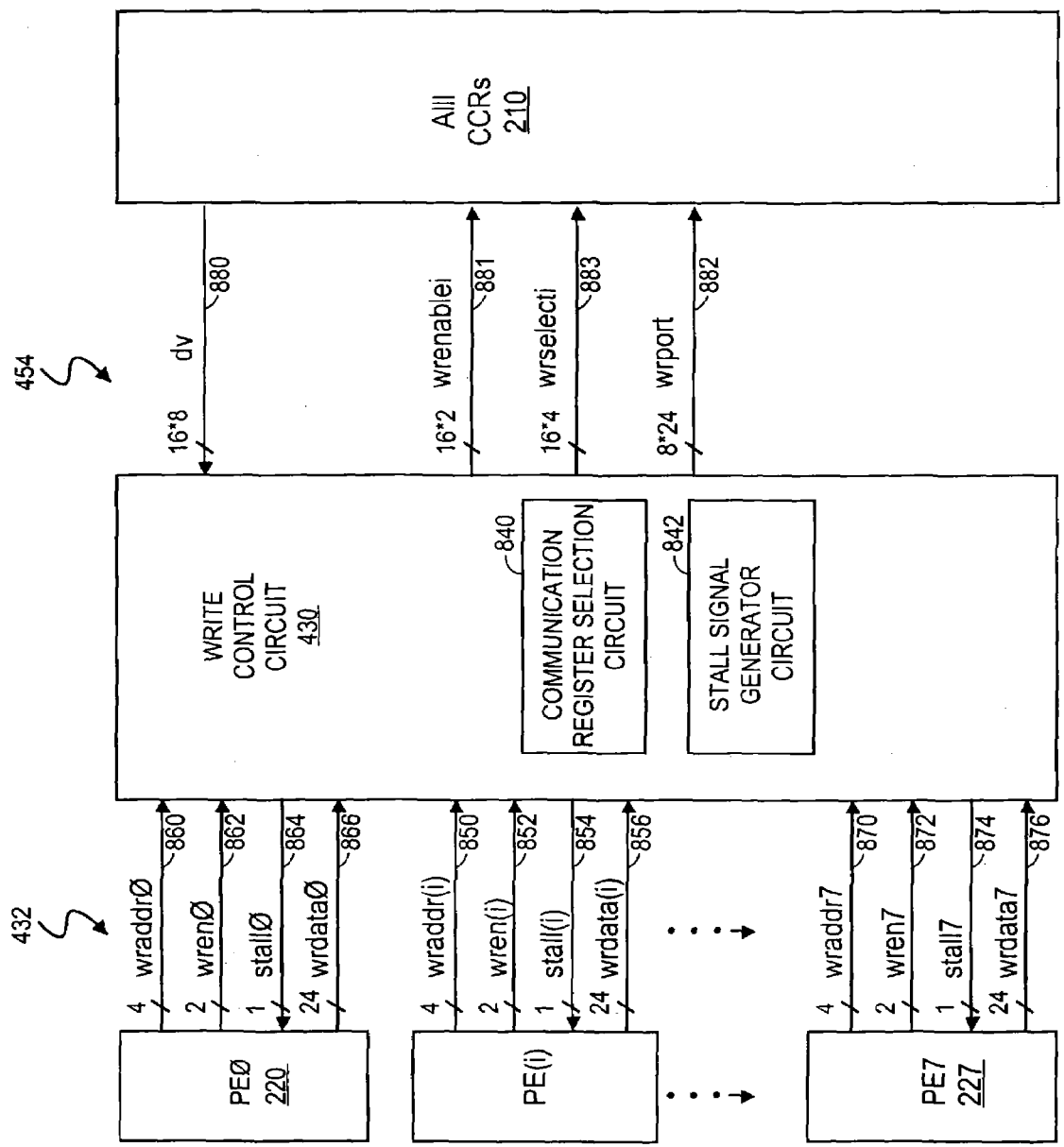
FIG. 7 is a block diagram of the PEs coupled to the write control circuit and to the CCRs for writing data to the CCRs, according to one embodiment of the invention.

Furthermore, write control circuit 430 allows each PE to write to any CCR. For instance, FIG. 7 is a block diagram of the PEs coupled to the write control circuit and to the CCRs for writing data to the CCRs, according to one embodiment of the invention. FIG. 7 shows PE0 220 coupled to write control circuit 430 via write address PE0 (wraddr0) line 860 for signals having four bits of address, write enable PE0 (wren0) line 862 for signals having two bits of write enable, stall PE0 (stall0) line 864 for signals having one bit of stall, and write data PE0 (wrdata0) line 866 for signals having twenty-four bits of data. Line 860 allows PE0 to provide a desired CCR address to write to, to circuit 430. Line 862 allows PE0 to provide a write enable signal to indicate to circuit 430 that PE0 is writing. Line 866 provides the write data from PE0 to circuit 430 for writing to a CCR. Line 864 allows write control circuit 430 to transmit a stall signal to PE0 to indicate whether or not circuit 430 will accept an attempted write by PE0 for a CCR. Moreover, as described above, embodiments include multiple PEs. Thus, PE, CCR, and circuit 430 functionality and lines corresponding to those described above with respect to lines 860 through 866 may be provided for each PE. For Instance, PE, CCR, circuit 430 functionality and lines for wraddr(i) line 850, wren(i) line 852, stall(i) line 854, and wrdata(i) line 856 may be included in embodiments. Particularly, for PE7 lines 870 through 876 having the same functionality as corresponding lines 860 through 866 may be used to couple PE7 227 to write control circuit 430.

FIG. 7 also shows all CCRs 210 coupled to write control circuit 430 via data valid (dv) line 880 for sixteen signals each having eight bits of data valid to provide circuit 430 with the data valid field identification of target or selected PEs for every CCR, write enable any PE to any CCR (wrenablei) line 881 for sixteen signals each having two bits of write enable from any PE to any CCR, write select any PE to any CCR (wrselecti) line 883 for sixteen signals each having four bits of write select from any PE to any CCR (e.g., such as for each CCR getting a four bit vector), and write data any PE to any CCR (wrdata) line 882 for eight signals each having twenty-four bits of data to write data from any PE to any CCR. Thus, circuit 430 is able to provide write data, write data select, and write enable once to (e.g., via the eight signal lines of line 882 and the sixteen signal lines of each of lines 881 and 883), and return a data valid once from (e.g., via the sixteen signal lines of line 880) any CCR of all CCRs 210 for each PE during a clock cycle.

Although FIG. 7 shows write address lines such as lines 850 and 860 for signals having four bits of address, write enable lines such as lines 852 and 862 for signals having two bits of write enable, stall lines such as 854 and 864 for signals having one bit of stall, write data lines such as lines 866 and 856 for signals having twenty-four bits of data, write data line 882 for sixteen signals each having twenty-four bits of data, write enable line 881 for sixteen signals each having two bits of write enable, and data valid line 880 for sixteen signals each having eight bits of data valid, embodiments include PE, CCR, and circuit 430 functionality, and lines having various other numbers of signals and bit capacities, such as for more or fewer signals having more or fewer bits than described above.

While circuits 430 and 440 are described above as providing read data twice from and write data once to any CCR from each PE during a clock cycle, according to embodiments, a PE is able to read more than two pieces of data from and write more than one piece of data to any CCR during a clock cycle. For example, a PE may be able to read three, four, or more pieces of data from, and write to, three, or more pieces of data to a CCR as allowed by the speed, area, and performance tradeoffs of the electronic circuitry and components of the PEs, CCRs, and circuits 430 and 440, as described herein.

In embodiments, write control circuit 430 is implemented using one or more of the following: multiplexers; switches; control logic; logic gates; and other circuitry for routing signals or data. Thus, control logic circuitry such as RTL can be used to implement the write control circuit and can be described using VHDL like syntax. For instance, Table 2 is a Write and Data Valid Bit Reset Pseudo-Code Example for performing write and resetting data valid bits, according to an embodiment of the invention.

TABLE 2

Write and Data Valid Bit Reset Pseudo-Code Example

```
   -- clocked process to update the register contents
   PROCESS(reset,clk)
   -- write the regs
   BEGIN
       IF reset='1' THEN
--           FOR i in 15 downto 0 LOOP
--               gprreg(i) <= "000000000000000000000000";
--           END LOOP;
           gprreg <= (others=>(others=>'0'));
       ELSIF rising_edge(clk) THEN
           -- for each register do the following
           for i in 15 downto 0 loop
               -- write the low byte
               if (wrenablei(i)(0) = '1') then
                   case wrselecti(i) is
                       when "0000" => gprreg(i)(7 downto 0) <= wrport(0)(7 downto 0); --pe0
                       when "0001" => gprreg(i)(7 downto 0) <= wrport(1)(7 downto 0);-- pe1
                       . . .
                       when others => gprreg(i)(7 downto 0) <= gprreg(i)(7 downto 0); --recir
                   end case;
               else
                   gprreg(i)(7 downto 0) <= gprreg(i)(7 downto 0); --recirc
               end if;
```

TABLE 2-continued

Write and Data Valid Bit Reset Pseudo-Code Example

```
              -- write the high byte
              if (wrenablei(i)(1) = '1') then
                          case wrselecti(i) is
                                when "0000" => gprreg(i)(15 downto 8) <= wrport(0)(15 downto 8); --pe0
                                when "0001" => gprreg(i)(15 downto 8) <= wrport(1)(15 downto 8); --pe1
                                . . .
                                when others => gprreg(i)(15 downto 8) <= gprreg(i)(15 downto 8); --recir
                          end case;
              else
                    gprreg(i)(15 downto 8) <= gprreg(i)(15 downto 8); --recirc
              end if;
              if ((wrenablei(i)(0) = '1') or (wrenablei(i)(1) = '1')) then
                          case wrselecti(i) is
                       when "0000" => gprreg(i) (23 downto 16) <= wrport(0)(23 downto 16);
                       when "0001" => gprreg(i)(23 downto 16) <= wrport(1)(23 downto 16);
                       when "0010" => gprreg(i)(23 downto 16) <= wrport(2)(23 downto 16);
                       . . .
                       when others => NULL;
                    end case;
              else
                    -- clear individual bits
                    -- pe0 read, so clear bit 16th.
                    if((rdaddrdec1i(0)(i) or rdaddrdec2i(0)(i)) = '1') then
                          gprreg(i)(16) <= '0';
                    end if;
                    -- pe1 read, so clear bit 17th
                    if((rdaddrdec1i(1)(i) or rdaddrdec2i(1)(i)) = '1')then
                          gprreg(i)(17) <= '0';
                    end if;
                    . . .
                    . . .
              END IF;
          END LOOP;
      END IF;
   END PROCESS;
```

The pseudo-code of Table 2 is a clocked process for which actual data writes and data valid resets occur. The code of Table 2 is distinct from the code of Tables 1, and 3–7 herein, as Tables 1, and 3–7 herein generate signals in a combination process and the clocked process of Table 2 updates the CCR state (e.g., resets the data valid bits) based on reads/writes from various PEs.

Also in embodiments, write control circuit 430 may include communication register selection circuit 840 to identify the selected communication register (e.g., such as CCR 461 of CCRs 460 through 475) from a write address signal (e.g., such as asserted on line 860) asserted by one of the plurality of processing elements (e.g., such as PE0 220).

Embodiments also include write control circuit 430 having stall signal generator 842 to generate a stall signal (e.g., such as via line 864) to stop one or more of the plurality of processing elements (e.g., such as PE0 220) from writing a second data (e.g., data similar to data 550 written via line 866) to the selected communication register (e.g., CCR1 461) when the data valid field of the selected communication register includes at least one selected PE for reading data currently stored in the communication register. The stall signal may include a bit location corresponding to each CCR. For example signal 864 may be a sixteen bit vector with a bit corresponding to each one of the plurality of CCRs, wherein at least one of the stall bits is set identifying a communication register that will not accept data from a PE (e.g., such as from PE0 220). More particularly, for instance, generator 842 may generate a stall signal transmitted via line 864 to stop PE0 220 from writing a second data to CCR1 461 if data valid field 380 for CCR1 includes a set data valid bit (e.g., such as a logical "1" at bit location 490).

According to embodiments, there may be a stall exception for a single targeted or selected PE reading stored data. Generally, a CCR stops other PEs from writing over stored data with stall signal, as described above. However, if a single targeted or selected PE remains reading data stored on a selected CCR, the write control circuit may allow the targeted or selected PE that is reading the data to send data to the selected CCR to overwrite the data stored at the selected CCR. In this manner, a targeted or selected PE can "reserve" a selected CCR by writing data to the selected CCR to be read by the selected PE. In response, the selected CCR will stall all other PEs, except the selected PE. Thus, the selected PE can hold onto the selected CCR, reserving that CCR, as long as the selected PE needs the selected CCR. When the selected PE no longer needs the selected CCR, the selected PE can release the selected CCR by writing all logical "0"'s into all of the DV bit locations of the selected CCR.

Also, in embodiments the stall signal lets a writing PE know that write data was successfully written to a selected CCR. For instance, if write data from PE1 221 is successfully written to and stored by CCR8, then a stall signal is returned to PE1 with a stall bit logical "0" corresponding to CCR8 (e.g., such as a stall signal that will allow PE1 to write again to CCR8).

As noted above with respect to Table 2, in embodiments, read control circuit 440 can be implemented using various circuitry and control logic that can be described using VHDL like syntax. For instance, Table 3 is a Write Address Pseudo-Code Example for decoding the write address to each PE.

TABLE 3

Write Address Pseudo-Code Example

```
for i n 0 to 7 loop
    if(wren (i) = '1') then
        case wraddr(i) is
            when "0000" => wraddrdecv(i) := "0000000000000001";
            -- reg 0
            when "0001" => wraddrdecv(i) := "0000000000000010";
            when "0010" => wraddrdecv(i) := "0000000000000100";
            when "0011" => wraddrdecv(i) := "0000000000001000";
            when "0100" => wraddrdecv(i) := "0000000000010000";
            when "0101" => wraddrdecv(i) := "0000000000100000";
            when "0110" => wraddrdecv(i) := "0000000001000000";
            when "0111" => wraddrdecv(i) := "0000000010000000";
            when "1000" => wraddrdecv(i) := "0000000100000000";
            when "1001" => wraddrdecv(i) := "0000001000000000";
            when "1010" => wraddrdecv(i) := "0000010000000000";
            when "1011" => wraddrdecv(i) := "0000100000000000";
            when "1100" => wraddrdecv(i) := "0001000000000000";
            when "1101" => wraddrdecv(i) := "0010000000000000";
            when "1110" => wraddrdecv(i) := "0100000000000000";
            when "1111" => wraddrdecv(i) := "1000000000000000";
            --reg 15
            when others => wraddrdecv(i) := "0000000000000000";
            -- none
        end case;
    else
        wraddrdecv(i) := "0000000000000000";
    end if;
end loop;
```

In this embodiment, the wraddrdecv(i) is a sixteen bit vector with one bit for each CCR. A bit in wraddrdecv(i) is logical "1" only if wren is logical "1". The wraddrdecv will be used to determine if a data write to a CCR should occur.

Moreover, circuitry and/or control logic for providing write enabled signals may be provided, the functionality of which may be described by VHDL like syntax. For example, Table 4 is a Priority and Writablility Pseudo-Code Example implementing a priority encoder to determine the PE that can write to each register.

TABLE 4

Priority and Writability Pseudo-Code Example

```
-- for each register determine the PE that can write to it. wrselectv holds
the winner PE number.
-- CCR's are called gprreg here. gprreg(i) = CCR(i). gprreg(15 downto
0) == 16-bit data.
-- gprreg(23 downto 16) correspond to DV bits. gprreg(16) = PE0 DV bit.
gprreg(17) = PE1 DV bit . . .
for i in 0 to 15 loop
    -- pe 0
    if ((wraddrdecv(0)(i) and -- Can PE0 write to this register ?
        not(gprreg(i)(17)) and -- PE1 DV bit is 0
        not(gprreg(i)(18)) and -- PE2 DV bit is 0
        not(gprreg(i)(19)) and -- PE3 DV bit is 0
        not(gprreg(i)(20)) and
        not(gprreg(i)(21)) and
        not(gprreg(i)(22)) and
        (not(gprreg(i)(23))
    ) = '1') then
        wrselectv(i) := "0000";
    -- pe 1
    elsif ((wraddrdecv(1)(i) and -- Can PE1 write to this register ?
        not(gprreg(i)(16)) and -- PE0 DV bit is 0
        not(gprreg(i)(18)) and -- PE2 DV bit is 0
        not(gprreg(i)(19)) and
        not(gprreg(i)(20)) and
        not(gprreg(i)(21)) and
        not(gprreg(i)(22)) and
        (not(gprreg(i)(23))
    ) = '1') then
        wrselectv(i) := "0001";
```

TABLE 4-continued

Priority and Writability Pseudo-Code Example

```
    -- pe 2
    elsif ((wraddrdecv(2)(i) and
        ...
        ...
    else
        wrselectv(i) := "1000"; -- noone can write so recirculate the
        contents.
    end if;
end loop;
```

In embodiments, a difference between this and any other priority encoder is that in addition to considering the write requests (to prioritize), Table 4 also considers the writability condition. For instance, a PE can write a CCR only if all the CCR's DV bits (except for the DV bit that corresponds to the PE that is writing) are logical "0". wrselectv(i) holds the PE number that has won the arbitration and also met the writability condition.

Likewise, the functionality of circuitry and/or control logic for providing the write enable signals, such as transmitted via wren0 line 862, can be described by VHDL like syntax. For instance, Table 5 is a Write Enable Pseudo-Code Example for generating write enables for each CCR. Since the PE selected to write to a CCR has been determined by logic such as having the functionality shown in Table 4, the selected PE information can be used to generate the appropriate write enables for each.

TABLE 5

Write Enable Pseudo-Code Example

```
-- write enables from the respective pe
for i in 0 to 15 loop
    case wrselectv(i) is
        when "0000" => wrenablei(i) <= wren(0);
        when "0001" => wrenablei(i) <= wren(1);
        when "0010" => wrenablei(i) <= wren(2);
        when "0011" => wrenablei(i) <= wren(3);
        when "0100" => wrenablei(i) <= wren(4);
        when "0101" => wrenablei(i) <= wren(5);
        when "0110" => wrenablei(i) <= wren(6);
        when "0111" => wrenablei(i) <= wren(7);
        when others => wrenablei(i) <= "00";
    end case;
end loop;
```

In this embodiment, the wrenable is a sixteen by two (16×2) bit vector and wrenable(i) is an eight bit vector with one bit corresponding to each PE.

Moreover, as described above, write enable may also include two bits to instruct the selected CCR being written to which data field the data provided by the writing PE is to be written into. For instance, the following example corresponds with the pseudo-code of Table 2 and FIG. 4:

| | |
|---|---|
| 00 | do nothing |
| 01 | write data to low 8 bytes only |
| 10 | write data to high 8 bytes only |
| 11 | write data to high and low 8 bytes |

The example above shows bits "00" which tell the CCR written to to do nothing (e.g., write not data to data one field 483 or data two field 484), bits "01" tell the CCR written to to write data to the low 8 bytes only (e.g., write data to data one field for 483, but not data two field 484), bits "10" tell the CCR being written to to write data to the high 8 bytes only (e.g., write data to field 484 but not field 483), and bits "11" tell the selected CCR being written to to write data to both the high 8 and low 8 bytes (e.g., write data to field 483 and field 484).

Stall generator circuit 842 may be implemented by circuitry and/or control logic, the functionality of which can be described by VHDL like syntax. For instance, Table 6 is an All PE's Stall Generator Pseudo-Code Example pertaining to stall generation.

TABLE 6

All PE's Stall Generator Pseudo-Code Example

```
-- generate stalls from each wrselect signal
-- for each PE that could not write, we need to return a stall=1. and the
PE that succeeded should get a stall=0
    for i in 15 downto 0 loop
        case wrselectv(i) is
            -- PE0
            when "0000" => stallsv(0)(i):='0';
                           stallsv(1)(i):='1';
                           stallsv(2)(i):='1';
                           stallsv(3)(i):='1';
                           stallsv(4)(i):='1';
                           stallsv(5)(i):='1';
                           stallsv(6)(i):='1';
                           stallsv(7)(i):='1';
            -- PE1
            when "0001" => stallsv(0)(i):='1';
                           stallsv(1)(i):='0';
                           stallsv(2)(i):='1';
                           stallsv(3)(i):='1';
                           stallsv(4)(i):='1';
                           stallsv(5)(i):='1';
                           stallsv(6)(i):='1';
                           stallsv(7)(i):='1';
            . . .
            . . . for other PE's
            when others => stallsv(0)(i):='1';
                           stallsv(1)(i):='1';
                           stallsv(2)(i):='1';
                           stallsv(3)(i):='1';
                           stallsv(4)(i):='1';
                           stallsv(5)(i):='1';
                           stallsv(6)(i):='1';
                           stallsv(7)(i):='1';
        end case;
    end loop;
```

In Table 6, each PE that succeeded in writing to a CCR should get a stall=0 and all the other PE that did not succeed should get a stall=1. Also, wrselectv(i) determines the stall(i) for each PE. In this embodiment, the stall(i) is a vector of sixteen bits with each bit corresponding to a CCR. For example, stall(0) is a sixteen bit vector for PE0. In generating a sixteen bit vector for stall (with a bit for every CCR), the only bit that counts for a PE is the bit for the CCR to which the PE is attempting to write. For example, if PE0 is attempting to write to CCR2, then the bit of interest would be stallsv(0)(2).

In conjunction with Table 6, stall signals to PEs, such as transmitted from circuit 430 to PE0 220 via line 864, may be generated by circuitry and/or control logic, the functionality of which can be shown by VHDL like syntax code. For example, Table 7 is an Each PE Final Stall Generator Pseudo-Code Example, showing final stall signal generation.

TABLE 7

Each PE Final Stall Generator Pseudo-Code Example

```
for i in 0 to 7 loop
    if (wren(i) = '1') then
        case wraddr(i) is
            when "0000" => stli(i) <= stallsv(i)(0);
            when "0001" => stli(i) <= stallsv(i)(1);
            when "0010" => stli(i) <= stallsv(i)(2);
            when "0011" => stli(i) <= stallsv(i)(3);
            when "0100" => stli(i) <= stallsv(i)(4);
            when "0101" => stli(i) <= stallsv(i)(5);
            when "0110" => stli(i) <= stallsv(i)(6);
            when "0111" => stli(i) <= stallsv(i)(7);
            when "1000" => stli(i) <= stallsv(i)(8);
            when "1001" => stli(i) <= stallsv(i)(9);
            when "1010" => stli(i) <= stallsv(i)(10);
            when "1011" => stli(i) <= stallsv(i)(11);
            when "1100" => stli(i) <= stallsv(i)(12);
            when "1101" => stli(i) <= stallsv(i)(13);
            when "1110" => stli(i) <= stallsv(i)(14);
            when "1111" => stli(i) <= stallsv(i)(15);
            when others => stli(i) <= '0';
        end case;
    else
        stli(i) <= '0';
    end if;
end loop;
```

As noted earlier in the Table 6 example, the stallsv(i) is a sixteen bit vector with one bit for each CCR. Also, the stallsv(i)(j) that is of interest is the one where PE(i) is attempting to write to CCR(j). The code of Table 7 generates the proper stall signal for each PE using the wren signal and wraddr from each PE.

Although Tables 1–7 are pseudo-code examples for sixteen CCRs and eight PEs, embodiments include more or fewer than sixteen CCRs for which the example pseudo-code in Tables 1–7 and corresponding logic and registers can be easily adapted. Likewise, in embodiments including more or fewer than eight PEs, the example pseudo-code in Tables 1–7 and corresponding logic and registers can also be adapted.

Figure 8:
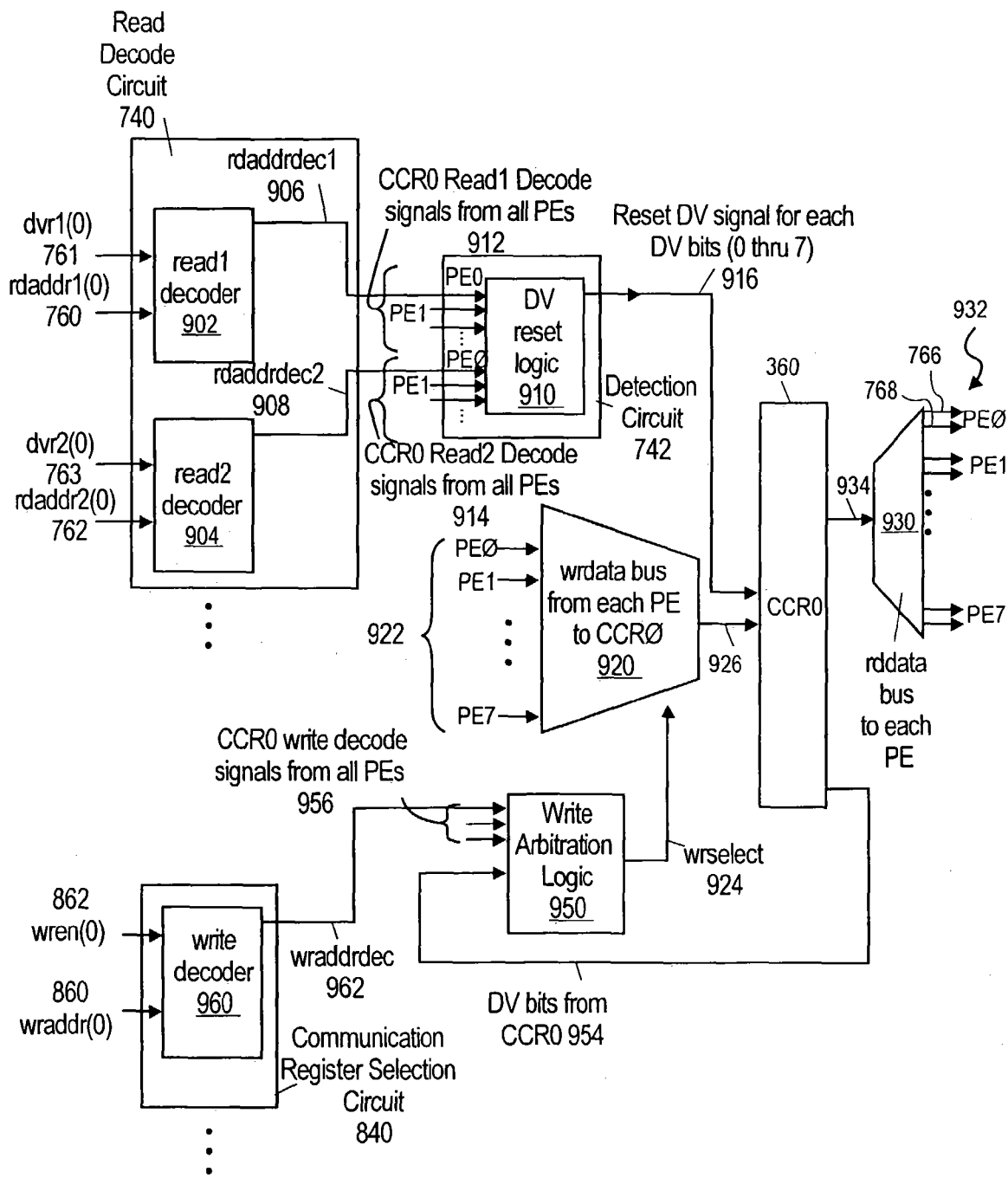
FIG. 8 is a CCR block diagram example implementation of circuitry and/or control logic implemented in accordance with Tables 1–7, according to one embodiment of the invention.

For example, FIG. 8 is a CCR block diagram example implementation of circuitry and/or control logic implemented in accordance with Tables 1–7. FIG. 8 shows, read decoder circuit 740 including read one decoder 902 coupled to line 760 and line 761, and read two decoder 904 coupled to line 762 and line 763. Decoder 902 is coupled to data valid reset logic 910 via read address decode channel one (rdaddrdec1) line 906, and decoder 904 is coupled to logic 910 via read address decoder channel two (rdaddrdec2) line 908. As shown in FIG. 8, logic 910 may be part of deselection circuit 742. Thus logic 910 may receive CCR0 read channel one decode signals from all PEs, such as is indicated by lines 912; as well as CCR0 read channel two decode signals from all PEs, such as indicated by lines 914. In turn, logic 910 is coupled to CCR0 360 via reset DV signal for each DV bits (0 through 7) lines 916. For example, lines 916 may be a subset of reset DV lines 780.

As decoders 902 and 904 may be part of circuit 740, decoders 902 and 904 may include circuitry and/or control logic associated with Table 1, above. Similarly, as logic 910 may be part of circuit 742, logic 910 may include circuitry and/or control logic associated with Table 2.

FIG. 8 also shows write decoder 960, which may be part of communication register selection circuit 840, coupled to line 862 and line 860. In embodiments, decoder 960 may function similar to a circuitry and/or control logic associated with Table 3. Decoder 960 is coupled to write arbitration logic 950 via write address decode (wraddrdec) line 962. Logic 950 determines whether any PE can write to CCR0 in accordance with that PE's priority and writability condition for CCR0, as described above. However, for any PE attempting to write to CCR0 that is not authorized to do so, a stall signal may be returned to that PE, stalling that PE from writing to CCR0 (e.g., such as returning a stall signal as described above, including a logical "1" for that PE), such as via circuitry and/or control logic associated with Tables 6 and 7. Logic 950 may also receive CCR0 write decode signals from all PEs, such as shown by lines 956.

Logic 950 is also coupled to CCR0 360 via DV bits from CCR0 line 954, and coupled to write data bus from each PE 920 via write to CCR0 authorization line 924. Thus, logic 950 may function similar to circuitry and/or control logic in accordance with Table 4 to authorize a requesting PE to write to CCR0 by considering the priority of the requesting PE (e.g., as compared to other requesting PEs) and the writability condition of CCR0 for the requesting PE. Write data bus 920 is coupled to each PE via write data from each PE to CCR0 line 922, and is coupled to CCR0 via write to CCR0 line 926. In embodiments, write data bus 920 functions in accordance with circuitry and/or control logic associated with Table 2.

Next, read data bus to each PE 930 is coupled to CCR0 360 via read bus data from CCR0 line 934. In turn, read data bus 930 is coupled to each PE via read data bus from CCR0 to each PE line 932. More specifically, bus 930 may provide data to PE0 such as via lines 766 and 768. In embodiments, read data bus 930 functions in accordance with lines 760 through 768, circuit 440, and lines 780 through 782, as described above with respect to FIG. 6 (e.g., register address space of each PE may be mapped to CCR0 through CCR15, so that each PE can read/write to any CCR as that PE would to any other register in that PE's local address space).

Figure 9:
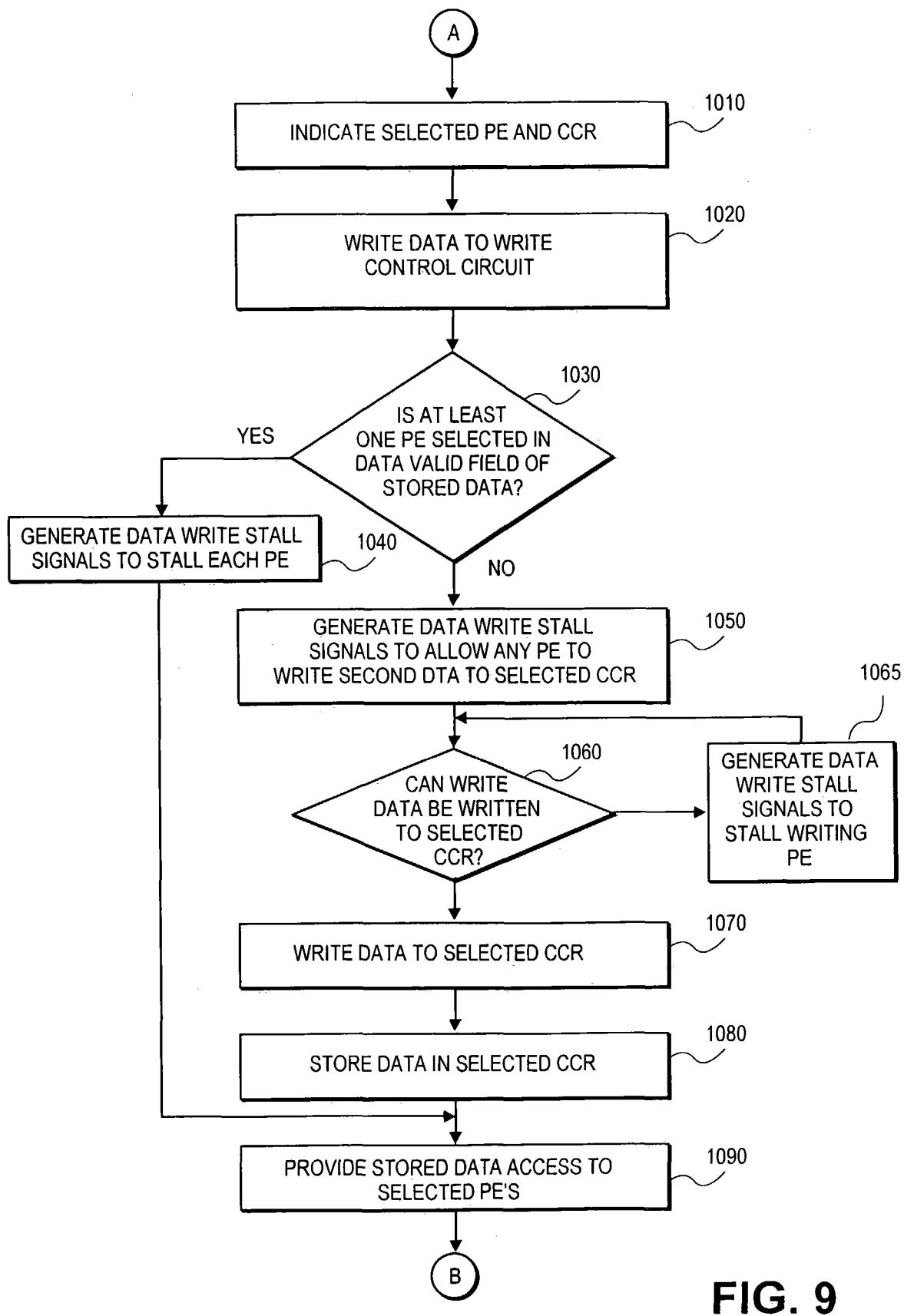
FIG. 9 is a flow diagram of a process for a writing PE to write data to a selected CCR for reading by a selected PE, according to one embodiment of the invention.

FIG. 9 is a flow diagram of a process for a writing PE to write data to a selected CCR for reading by a selected PE, according to one embodiment of the invention. At 1010, at least one selected or "target" PE of a plurality of PEs (which may include the writing PE) is indicated to read data to be written to a selected communication register of a plurality of communication registers. For example, a writing PE (e.g., PE0 220) may identify, such as in a data valid field, one or more target or selected PEs (e.g., such as PE7 227). Indicating may include setting at least one of a plurality of data valid bits in the data to be written, each of the plurality of data bits corresponding to one of the plurality of processing elements, the set of data valid bits identifying the at least one selected processing element. For example, a writing PE may indicate the PE selected to read the data being written via the data valid field of the data being written. Thus, PE0 220 may specify that PE7 227 is the selected PE by indicating in the portion of address space 370 providing data valid bits 540 of data 550 being written that PE7 227 is the selected target of the data being written to write control circuit 430 for transmission to selected CCR1 461. Thus, in a particular example, PE0 indicates PE7 of PE0 through PE7, to read data to be written to a selected CCR.

Also, at 1010 a PE selects a CCR as a target for a data write, such as by a writing PE asserting a write address. In the instance of the particular example above, the writing PE 220 may select CCR1 461, of CCR0 through CCR15, using an address transmitted via write address PE0 line 860, to write to CCR1 in PE0's local address space as described with respect to FIGS. 3 and 4. Thus data may be written to an address defined within the writing PE's address space that maps directly to a selected CCR.

At 1020, write data to be read by the selected PE is written by the writing PE to write control circuit 430.

At 1030, it is determined whether the data valid field for the selected CCR indicates at least one selected or target PE. For example, field 380 for the selected CCR storing data is checked to determine whether a target or selected PE for reading that stored data is still indicated. More particularly, with respect to the particular example above, data valid bit locations 416 through 423 of field 380 for CCR1 461 are checked to see if bits 516 through 523 stored in the bit locations include one or more set bits (e.g., the set bits being logical "1"'s corresponding to and identifying a target or selected PE for which the data stored at CCR1 is still available to be read).

After 1030, a data write stall signal is generated for transmission to each PE. For example, at 1040, a data write stall signal can be asserted to a plurality of PEs to stop each of the PEs from writing a data to the selected communication register, if at 1030 data stored in the selected communication register includes a data valid field identifying a target or selected PE for reading the stored data. More specifically, according to the particular example above, if data stored in CCR1 461 includes a bit set in data valid field 380, such as a bit set at bit location 490, write control circuit 430 may stall all PEs from writing to CCR1 461. Thus, in the particular example above, a stall signal is asserted to each of PE0 through PE7, stopping those PEs from writing a data to CCR1 while data in CCR1 has a bit set at bit location 490. After 1140, the process continues to 1090, as shown.

In some embodiments, the data write stall signals do not stall the PE that wrote the data (e.g., the writing PE) to the selected communication register (e.g., as will be described further below at 1060). For instance, in the particular example above, PE1 through PE7 would be stalled from writing to CCR1 while the bit at location 490 was set, but since PE0 is the writing PE that wrote the data to CCR1 461 including the bit set at bit location 490, PE0 would not be stalled from writing to CCR1. Correspondingly, in embodiments, one or more selected or target PEs of a related CCR may not be stalled from writing to that selected CCR. Thus, in the particular example above, as PE7 is a selected PE identified by a bit set at bit location 490, the stall signal from circuit 430 to PE7 could allow PE7 to write to CCR1 461.

If, at 1030, the data valid field of data stored at the selected CCR does not indicate at least one target or selected PE, at 1050 a data write stall signal is generated to each PE, to allow any PE to write a data to the related CCR. For instance, if the data valid field 380 of a selected CCR does not indicate any targeted or selected PEs to read to the data stored in that CCR, no PEs will be stalled from writing to that CCR and data may be written to the selected CCR. Hence, in the particular example above, if bit locations 416 through 423 of CCR1 461 include no set bits (e.g., bit locations 416 through 423 only include logical "0" bits) then write control circuit 430 can generate stall signals to each PE that do not stall any PE from writing to CCR1 461. In embodiments, 1030, 1040, and 1050 may be implemented by circuitry and/or control logic including that described by Tables 6 and 7. After 1050, the process continues to 1060.

At 1060, it is determined whether the write data is authorized to be written to the selected CCR. For example, write control circuit 430 determines whether the writing PE has priority to write to the selected CCR, and whether the selected CCR writability condition is appropriate for the writing PE. According to embodiments, the writability condition is appropriate for the writing PE if no PEs are selected or targeted in the selected CCR's data valid field, or if only the writing PE is selected or targeted in the data valid field of the selected CCR. Thus, in the particular example above, circuit 430 determines that the write address provided by PE0 220 is of CCR1 461 (e.g., such as via circuitry and/or logic similar to that described by Table 3); whether PE0 has priority and writability to write to CCR1 461 (e.g., such as according to circuitry and/or control logic associated with Table 4); and thus what write enable to generate to enable PE0 to write to CCR1 461 (e.g., such as according to circuitry and/or control logic associated with Table 5).

Moreover, in embodiments, at 1060, it is also determined whether the selected CCR's writability condition is appropriate for the writing PE, such as by determining if a target or selected PE other than the writing PE has not completed reading the data currently stored in the selected CCR. In the particular example above, this means that circuit 430 determines whether PE0 220 is stalled from writing to CCR1 461 because data stored in CCR1 461 is still being read by another PE (e.g., such as if the data valid field 380 corresponding to CCR1 still indicates a target or selected PE other than PE0 has not completed reading the data currently stored at CCR1). According to embodiments 1060 may be implemented, such as in accordance with circuitry and/or control logic associated with Tables 6 and 7.

If the write data is not authorized to be written to the selected CCR, the current data stored in the CCR remains stored in that CCR (e.g., such as by recirculating that CCR's contents), and a stall signal is generated at 1065. At 1065, a data write stall signal is generated to stall the writing PE from writing to the selected CCR. After the writing PE is stalled, the process returns to 1060, as shown. According to embodiments, at 1065, the write stall signal may be generated similarly to stall signals generated, as described above, with respect to 1030, 1040, and 1050. Moreover, according to embodiments, 1065 may be implemented, such as in accordance with circuitry and/or control logic associated with Tables 6 and 7.

If the write data is authorized, at 1070, write data is written to the selected CCR. For instance, in our particular example, PE0 220 writes write data such as data 550 to CCR1 461 (e.g., such as via coupling 454 circuit 430 and coupling 432).

At 1080, the data written is stored in the selected CCR. For example, data may be written to and stored in a CCR, such as according to circuitry and/or control logic associated with Table 2. According to our particular example, data written, such as data 550, would be stored in CCR1 461 (e.g., bits 500 thorough 523 would be stored in bit locations 400 through 423 of CCR1 461).

At 1090, data stored in the selected CCR is broadcast to all selected PEs. For instance, in our particular example, access to data stored in CCR1 461 is provided (e.g., such as via coupling 442 read control circuit 440 and coupling 452), to any selected PE, such as PEs identified in the data valid field of CCR1. Particularly, bits in bit locations 416 through 423 for CCR1 corresponding to PE0 through PE7 that are set will cause circuit 440 to broadcast data stored at CCR1 to the local address space of PEs associated with those bits (e.g., to target or selected PEs). From 1090, the process advances via "B" to 1110.

Figure 10:
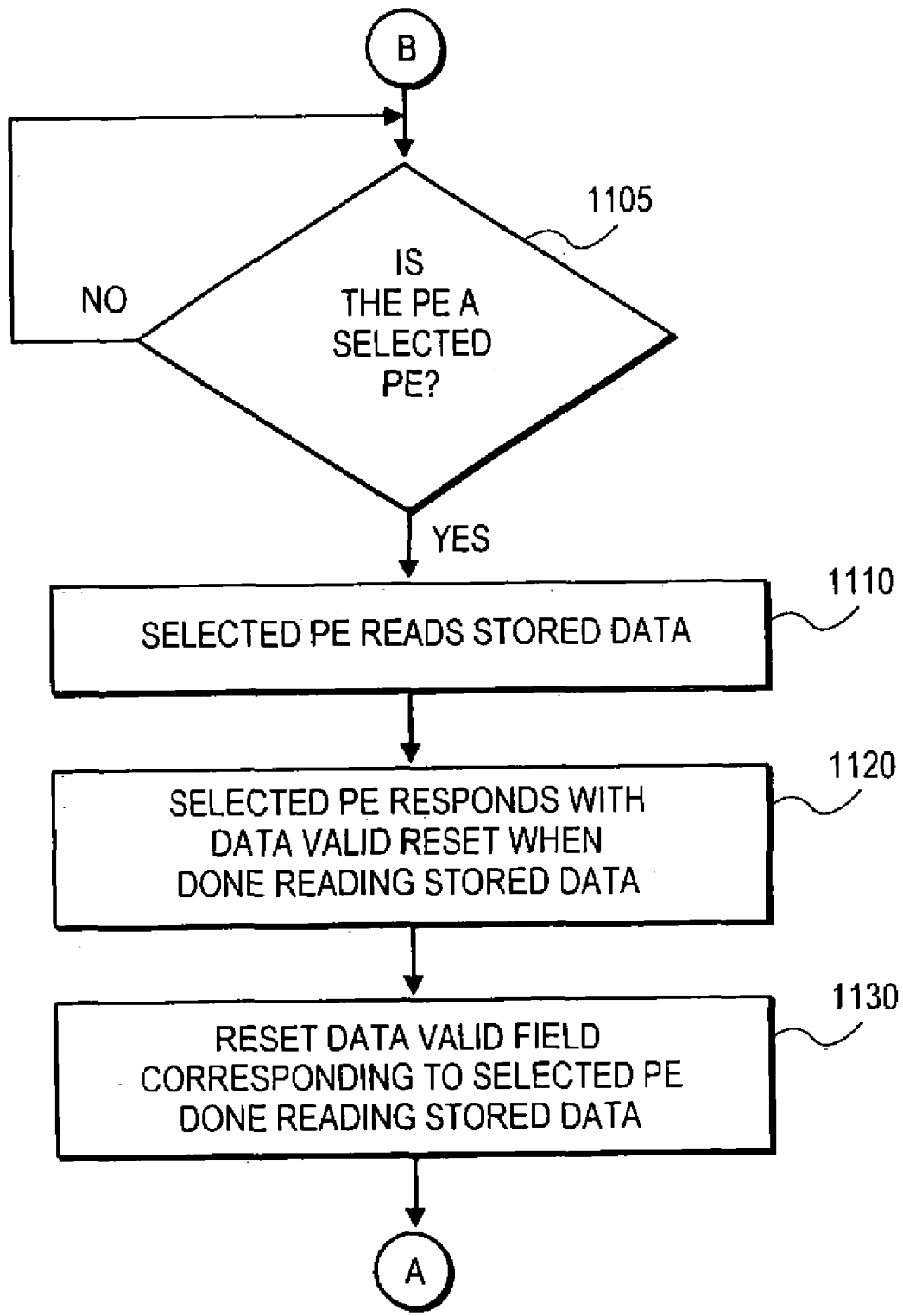
FIG. 10 is a flow diagram of a process for a selected PE reading data stored on a CCR, according to one embodiment of the invention.

FIG. 10 is a flow diagram of a process for a selected PE reading data stored on a CCR, according to one embodiment of the invention. For instance, at 1105, it is determined if a PE attempting to read data stored in a CCR is a selected or targeted PE for that data. In other words, if the data valid field of data stored in a CCR indicates one or more target or selected PEs at the target or selected PE may read the data stored on the selected CCR. Specifically, in embodiments, a PE having instructions to read data stored on a selected CCR may send a read address, such as via line 770 to circuit 440. Then, if the data stored indicates that the PE is a target or selected PE, such as via the data valid field, circuit 440 allows the PE to read the data stored from the PE's local address space. Thus, with respect to our particular example above, PE7 227 is a selected or targeted PE to read data 550 stored at CCR1 461 from PE0's local address space, if bit 523 at bit location 490 is set to logical "1".

At 1105, if the PE attempting to read data is not a selected or targeted PE, the process returns to 1105.

If at 1105, the PE attempting to read data is a selected PE, at 1110, the selected PE reads data stored at the selected CCR. Thus, with respect to our particular example above, PE7 227 reads data 550 stored at CCR1 461 from PE0's local address space which is also PE7's local address space because CCR1 is mapped into the local address space of all the PEs. Furthermore, such reading of data may be done via coupling 442, read control circuit 440 and coupling 452, where circuit 440 includes circuitry and/or control logic gates including that associated with Table 1.

At 1120, the target or selected PE responds with a data valid reset signal when the PE is done reading the stored data. With respect to the particular example above, when PE7 227 has completed reading data 550 stored at CCR1 461, PE7 returns a DVR signal, such as via line 771 to read control circuit 440 to indicate that PE7 has completed reading the stored data.

At 1130, the data valid field of the selected CCR identifying the selected PE that has completed reading the data is deselected for that PE. For example, read control circuit 440 resets one of the set data valid bits of the stored data identifying the processing element from which circuit 440 received the DVR signal and for which circuit 440 has a write enable, such as via one of lines 780 or 781. With respect to the particular example above, circuit 440 resets the data valid bit 523 stored at location 490 of CCR1 to a logical "0". In embodiments, 1120 and 1130 may be implemented by circuitry and/or control logic, the functionality of which includes that described in Table 2. After 1130, the process returns to 1010 via "A".

In embodiments, selecting or deselecting a PE or CCR (e.g., such as by selecting, deselecting or modifying of a data valid field) may include selecting, deselecting or modifying the data valid field, such as using active/inactive, "high/ low", logical "1" /logical "0", set/reset bits, and/or other asserted types of signals and signal logic (e.g., such as an analogue signal, or logical tri-state environment signals) that can be interpreted by electronic circuitry such as control logic, logic gates, multiplexers, and/or registers, to distinguish that signal as compared to other signals received by the circuitry. Moreover, selecting, deselecting, and modifying, data valid fields, data payload fields, other fields, bit locations, signals for signal lines, signal bit vectors, data values, data vectors, bits, and signals having bits of data may include signals and/or signal logic as described in the preceding sentence.

The invention is described with reference to specific embodiments thereof. However, it will be evident that various modifications and changes may be made thereto without departing from the broader spirit and scope of the invention as set forth in the claims. The specification and drawings are, accordingly, to be regarded in an illustrative rather than a restrictive sense.

What is claimed:

1. An apparatus comprising:
   a plurality of processing elements each having an addressing space;
   a plurality of communication registers shared by and mapped to the addressing space of each processing element of the plurality of processing elements, wherein each of the plurality of communication registers couples a first of the plurality of processing elements to every other one of the plurality of processing elements; and
   a write control circuit to write data to a selected communication register, the data to be stored in the selected communication register and to be read by at least one processing element.

2. The apparatus of claim 1, wherein each communication register of the plurality comprises a data payload field and a data valid field to indicate a target for a data payload.

3. The apparatus of claim 2, further comprising:
   a read control circuit to provide read access to data stored in the selected communication register to at least one selected processing element identified by the data valid field.

4. The apparatus of claim 3, wherein the read control circuit further comprises:
   a decode circuit to decode the data valid field and to provide read access to data stored in the selected communication register to a first of the plurality of processing elements, if the decoded data valid field corresponds to the first of the plurality of processing elements.

5. The apparatus of claim 3, wherein the read control circuit further comprises:
   a deselect circuit to modify the data valid field of the data stored in the selected communication register.

6. The apparatus of claim 3, wherein the write control circuit further comprises:
   a stall signal generator to generate a stall signal to stop the plurality of processing elements from writing a second data to the selected communication register, if the data valid field includes a selected processing element.

7. The apparatus of claim 6, wherein the data write stall signal has a plurality of stall bits, each of the stall bits corresponding to one of the plurality of communication registers, wherein the stall bits have at least one set stall bit identifying the selected communication register that will not accept data from the plurality of processing elements.

8. The apparatus of claim 2, wherein the data valid field has a plurality bit locations each corresponding to a potential target of the plurality of processing elements.

9. The apparatus of claim 8, wherein the target for a data payload is to be indicated by at least one set data valid bit in one of the plurality of bit locations in the data valid field.

10. The apparatus of claim 9, wherein a first of the processing elements is to set a first of the at least one set data valid bits, and a second of the processing elements is to read the data to be stored, if the first of the at least one set data valid bit is in a potential target register corresponding to the second of the processing elements.

11. The apparatus of claim 10, further comprising:
    a reset circuit to reset the first of the at least one set data valid bits, if a data valid reset signal is received from the second of the processing elements, the data valid reset signal to indicate that the second of the processing elements has completed reading the data to be stored.

12. The apparatus of claim 2, wherein the write control circuit further comprises:
    a communication register selection circuit to identify the selected communication register from a write address signal asserted by one of the plurality of processing elements.

13. The apparatus of claim 2, wherein each data payload field includes a plurality of bits of data, and each data valid field includes a plurality of data valid bits to indicate a target for the data payload.

* * * * *

UNITED STATES PATENT AND TRADEMARK OFFICE
CERTIFICATE OF CORRECTION

PATENT NO. : 7,162,573 B2
APPLICATION NO. : 10/603536
DATED : January 9, 2007
INVENTOR(S) : K. Mehta It is certified that error appears in the above-identified patent and that said Letters Patent is hereby corrected as shown below:

In column 4, at line 9, delete "CCRS" and insert --CCRs--.

In column 5, at line 47, delete "CCRS" and insert --CCRs--.

In column 7, at line 16, delete "CCRS" and insert --CCRs--.

Signed and Sealed this

Fifteenth Day of April, 2008

JON W. DUDAS
*Director of the United States Patent and Trademark Office*